US009426336B2

(12) United States Patent
Savare et al.

(10) Patent No.: US 9,426,336 B2
(45) Date of Patent: Aug. 23, 2016

(54) SYSTEM AND METHOD FOR TYING AUDIO AND VIDEO WATERMARKS OF LIVE AND RECORDED EVENTS FOR SIMULCASTING ALTERNATIVE AUDIO COMMENTARY TO AN AUDIO CHANNEL OR SECOND SCREEN

(71) Applicant: Fansmit, LLC, Roseland, NJ (US)

(72) Inventors: Matthew Richard Savare, Roseland, NJ (US); Jeffrey Sherwin, Scarsdale, NY (US)

(73) Assignee: Fansmit, LLC, Roseland, NJ (US)

( * ) Notice: Subject to any disclaimer, the term of this patent is extended or adjusted under 35 U.S.C. 154(b) by 86 days.

(21) Appl. No.: 14/220,586

(22) Filed: Mar. 20, 2014

(65) Prior Publication Data

US 2015/0092106 A1   Apr. 2, 2015

Related U.S. Application Data

(60) Provisional application No. 61/885,569, filed on Oct. 2, 2013.

(51) Int. Cl.
*H04N 7/025* (2006.01)
*H04N 5/04* (2006.01)
*H04N 21/43* (2011.01)
*H04N 21/242* (2011.01)
*H04N 21/234* (2011.01)
*H04N 21/8358* (2011.01)

(52) U.S. Cl.
CPC .......... *H04N 5/04* (2013.01); *H04N 21/23424* (2013.01); *H04N 21/242* (2013.01); *H04N 21/4307* (2013.01); *H04N 21/8358* (2013.01)

(58) Field of Classification Search
CPC ...................... H04N 21/233; H04N 21/23424; H04N 21/242; H04N 21/4307; H04N 21/44; H04N 21/4622
See application file for complete search history.

(56) References Cited

U.S. PATENT DOCUMENTS

| 5,894,320 | A  | * | 4/1999  | Vancelette ..................... 725/138 |
|-----------|----|---|---------|------------------------------------------|
| 6,753,925 | B2 | * | 6/2004  | Limaye ......................... 348/515 |
| 8,359,399 | B2 |   | 1/2013  | Landow et al. |
| 2001/0031066 | A1 | * | 10/2001 | Meyer et al. .................. 382/100 |
| 2003/0084442 | A1 | * | 5/2003  | Kellner .................. H04N 5/607 725/38 |
| 2004/0059570 | A1 | * | 3/2004  | Mochinaga et al. .......... 704/205 |
| 2004/0174908 | A1 | * | 9/2004  | Le Bars et al. ................ 370/516 |
| 2004/0220926 | A1 | * | 11/2004 | Lamkin et al. .................... 707/3 |

(Continued)

OTHER PUBLICATIONS

International Search Report for PCT Application No. PCT/US2014/055992 mailed Dec. 31, 2014.

*Primary Examiner* — Pankaj Kumar
*Assistant Examiner* — Timothy Newlin
(74) *Attorney, Agent, or Firm* — Lowenstein Sandler LLP

(57) ABSTRACT

An alternative content system receives a primary content data stream and a secondary content data stream associated with an event. The alternative content system provides an alternative content data stream associated with the event. The alternative content system extracts a primary content identifier from the primary content data stream. The alternative content system identifies an alternative content identifier based on the alternative content data stream. The alternative content system synchronizes the alternative content data stream to the primary content data stream based on the alternative content identifier and the primary content identifier. The alternative content system transmits the synchronized alternative content data stream based on the primary content identifier.

9 Claims, 9 Drawing Sheets

(56) References Cited

U.S. PATENT DOCUMENTS

| | | | |
|---|---|---|---|
| 2006/0013565 A1* | 1/2006 | Baumgartner | 386/96 |
| 2006/0156374 A1* | 7/2006 | Hu et al. | 725/135 |
| 2007/0282472 A1* | 12/2007 | Seldman | G11B 27/11 |
| | | | 700/94 |
| 2008/0062315 A1* | 3/2008 | Oostveen et al. | 348/500 |
| 2008/0219641 A1* | 9/2008 | Sandrew et al. | 386/84 |
| 2008/0282302 A1* | 11/2008 | Steelberg et al. | 725/110 |
| 2008/0317439 A1* | 12/2008 | Wong et al. | 386/124 |
| 2008/0320545 A1* | 12/2008 | Schwartz | H04N 7/17318 |
| | | | 725/135 |
| 2009/0091655 A1* | 4/2009 | Russell et al. | 348/515 |
| 2009/0171995 A1* | 7/2009 | Silvester | G06F 17/30056 |
| 2009/0183215 A1* | 7/2009 | McCartie et al. | 725/105 |
| 2009/0238536 A1* | 9/2009 | Gratton | G11B 27/034 |
| | | | 386/285 |
| 2009/0254843 A1* | 10/2009 | Van Wie et al. | 715/757 |
| 2011/0219307 A1* | 9/2011 | Mate et al. | 715/717 |
| 2012/0120314 A1* | 5/2012 | Yang et al. | 348/515 |
| 2012/0274850 A1 | 11/2012 | Hawkins et al. | |
| 2013/0169869 A1* | 7/2013 | Demoulin et al. | 348/515 |
| 2013/0227013 A1 | 8/2013 | Maskatia et al. | |
| 2013/0238751 A1 | 9/2013 | Raleigh et al. | |
| 2015/0062429 A1* | 3/2015 | Barbulescu et al. | 348/515 |
| 2015/0092106 A1* | 4/2015 | Savare et al. | 348/512 |

* cited by examiner

SYSTEM AND METHOD FOR TYING AUDIO AND VIDEO WATERMARKS OF LIVE AND RECORDED EVENTS FOR SIMULCASTING ALTERNATIVE AUDIO COMMENTARY TO AN AUDIO CHANNEL OR SECOND SCREEN

CROSS-REFERENCE TO RELATED APPLICATIONS

This application claims the benefit of U.S. provisional patent application No. 61/885,569 filed Oct. 2, 2013, the disclosure of which is incorporated herein by reference in its entirety.

FIELD OF THE INVENTION

The present invention relates generally to service provider video networks, and more particularly, to a method and system for synchronizing primary video content of live and recorded events with alternative content from a second audio channel or second screen.

BACKGROUND OF THE INVENTION

Television, radio, and other broadcast or recorded media have converted from analog to digital format with respect to recording and playback of programs. Digital television and radio are being integrated with the Internet, such that an end user may view live and recorded events from Internet-ready televisions, desktops, lap tops, tablet computers, mobile devices, etc. (herein referred to as "second screens").

There has also been an explosion of social media, such as Facebook, Twitter, etc., that permit users to join networks of social groups. Members of social networks may post text, still images, audio, and video, and have other members comment on and provide feedback for the posted items. There are a host of social networking providers that have married second screen and social media applications. There are a multitude of applications that marry the second screen and capitalize on social media. Such applications include IntoNow, Shazam, GetGlue, Miso, and Zeebox. The trend has been to enable second-screen providers to create content specifically for the second screen. The goal of second screen providers is to create heightened audience engagement, drive traffic to an application, and generate advertisement revenue.

There are also applications that enable audience members to discuss shows, events, and games (hereinafter "events"). Applications include Twitter and SportsYapper. There exist applications that permit users to broadcast events from their mobile devices, including alternative audio commentary. The alternative audio commentary may include play-by-play, color commentary, etc.

Unfortunately, providers of alternative audio commentary applications have had difficulty synchronizing the primary video track of the event with the alternative audio commentary track of the event. In certain situations, an end user of the alternative audio application may receive the alternative audio track significantly before receiving the primary video track. The end user may hear an alternative audio commentator announce that a player has hit a home run up to seconds before seeing the video feed, ruining the experience of the game. Another problematic effect encountered in alternative audio applications is known as drift. Drift occurs when there is a noticeable difference in time between when an end user and when an alternative audio commentator receive video of the same event. An alternative audio track received by the end user may still not be synchronized with the video track received by the end user.

Accordingly, what would be desirable, but has not yet been provided, is a system and method for synchronizing primary video of live and recorded events with alternative audio commentary from a second audio channel or a second screen.

SUMMARY OF THE INVENTION

The above-described problems are addressed and a technical solution is achieved in the art by providing a method and alternative content system for synchronizing primary video of live and recorded events with alternative audio commentary from a second audio channel or a second screen. The alternative content system receives a primary content data stream and a secondary content data stream from a content delivery network. Both the primary content data stream and the secondary content data stream are associated with an event. The alternative content system provides an alternative content data stream corresponding to the event. The alternative content system extracts a primary content identifier from the primary content data stream. The alternative content system identifies an alternative content identifier based on the alternative content data stream. The alternative content system synchronizes the alternative content data stream to the primary content data stream based on the alternative content identifier and the primary content identifier, respectively. The alternative content system transmits the synchronized alternative content data stream in place of the secondary content data stream to an end user system based on the primary content identifier.

In an example, the alternative content system transmitting the synchronized alternative content data stream to the end user system based on the primary content identifier may comprise the alternative content system comparing the primary content identifier to the alternative content identifier. When the primary content identifier and the alternative content identifier are equivalent, the alternative content system permits transmitting the synchronized alternative content data stream to the end user system. When the primary content identifier and the alternative content identifier are not equivalent, the alternative content system does not transmit the synchronized alternative content data stream to the end user system.

In an example, the alternative content system may further transmit the primary content identifier and the alternative content identifier to the end user system.

In an example, the primary content identifier uniquely identifies a portion of the primary content data stream. The alternative content identifier uniquely identifies a portion of the alternative content data stream. The primary content identifier and the alternative content identifier may be digital watermarks. In an example, the alternative content system may further generate a second alternative content identifier corresponding to the primary content identifier, where the alternative content identifier and the second alternative content identifier are digital watermarks. The alternative content system may further transmit the alternative content identifier and the second alternative content identifier to the second system.

In an example, the primary content identifier and the alternative content identifier may be digital fingerprints. In one example, the digital fingerprints or watermarks may be generated internally by the alternative content system or may be generated externally from a service provider or producer.

In an example, the primary content data stream corresponds to one of a video data stream, an audio data stream, or a metadata stream corresponding to the video data stream or the audio data stream. In an example, the alternative content data stream corresponds to one of a video data stream, an audio data stream, or a metadata stream corresponding to the video data stream or the audio data stream. In an example, the secondary content data stream is a primary audio commentary data stream and the alternative content data stream is an alternative audio commentary data stream.

The alternative audio commentary data stream may be a color commentary stream, play-by-play commentary stream, one or more external sound tracks (e.g., of a song, a movie, etc.) one or more foreign translations, voice casts (e.g., to audition people to find the best voice for an animate or dubbed film or audio book), etc. In one example, the alternative content system may be configured to add or drop various combinations of color commentary data streams, play-by-play data streams, sound tracks, foreign translations. The alternative content system may be configured to synchronize these various combinations with the primary content data stream.

In an example, the event may be a live event or a recorded event. The event may be a sporting event, an entertainment event, a video game, a sound track, a voice cast, etc.

The above-described problems are addressed and a technical solution is achieved in the art by providing a method and end user system for synchronizing primary video of live and recorded events with alternative audio commentary from a second audio channel or second screen. The end user system receives a direct primary content data stream and a secondary content data stream from a content delivery network. Both the direct primary content data stream and the secondary content data stream are associated with an event. The direct primary content data stream comprises a direct primary content identifier. The end user system receives from an alternative content system, an alternative content data stream corresponding to the event. The alternative content data stream comprises an alternative content identifier and an indirect primary content identifier. The indirect primary content identifier is associated with an indirect primary content data stream associated with the event. The alternative content data stream is synchronized to the indirect primary content data stream. The end user system extracts the direct primary content identifier from the direct primary content data stream. The end user system extracts the alternative content identifier and the indirect primary content identifier from the alternative content data stream. The end user system synchronizes the indirect primary content data stream with the alternative content data stream based on the direct primary content identifier, the indirect primary content identifier, and the alternative content identifier. The end user system replaces the secondary content data stream with the synchronized alternative content data stream. The end user system transmits the synchronized direct primary content data stream and the synchronized alternative content data stream to one or more devices associated with an end user.

To permit a second alternative commentator to provide commentary in addition to a first commentator, the end user system receives a second alternative content data stream corresponding to the event. The end user system identifies a second alternative content identifier based on the second alternative content data stream. The end user system synchronizes the second alternative content data stream to the primary content data stream based on the second alternative content identifier and the direct primary content identifier, respectively. The end user system transmits the synchronized second alternative content data stream to the one or more devices associated with the end user. In one example, the one or more devices may be a microphone, a head set, speakers, a storage system, etc. The one or more devices may include a storage system for storing the second alternative content data stream and the primary content data stream either as separate tracks or in combination.

In an example, the direct primary content identifier uniquely identifies a portion of the primary content data stream. The indirect primary content identifier uniquely identifies a portion of the indirect primary content data stream. The alternative content identifier uniquely identifies a portion of the alternative content data stream. In an example, the direct primary content identifier, the indirect primary content identifier, and the alternative content identifier are digital watermarks or digital fingerprints.

In an example, the direct primary content data stream, indirect primary content data stream, or the alternative content data stream correspond to one of a video data stream, an audio data stream, or a metadata stream corresponding to the video data stream or the audio data stream.

In an example, the alternative content data stream may be a second alternative audio commentary stream. The second alternative audio commentary stream may be a color commentary data stream, a play-by-play commentary stream, one or more external sound tracks, one or more foreign translations, etc. In one example, the end user system may be configured to add or drop various combinations of color commentary data streams, play-by-play data streams, and sound tracks. The end user system may be configured to synchronize these various combinations with the primary content data stream. In another example, output stream(s) from an end user system may serve as input streams to another alternative content system, serve as primary streams to another alternative content system or end user system, and/or be stored on a server. In an example, the event may be a live event or a recorded event. The event may be a sporting event, an entertainment event, a video game, a sound track, a voice cast, etc.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1A:
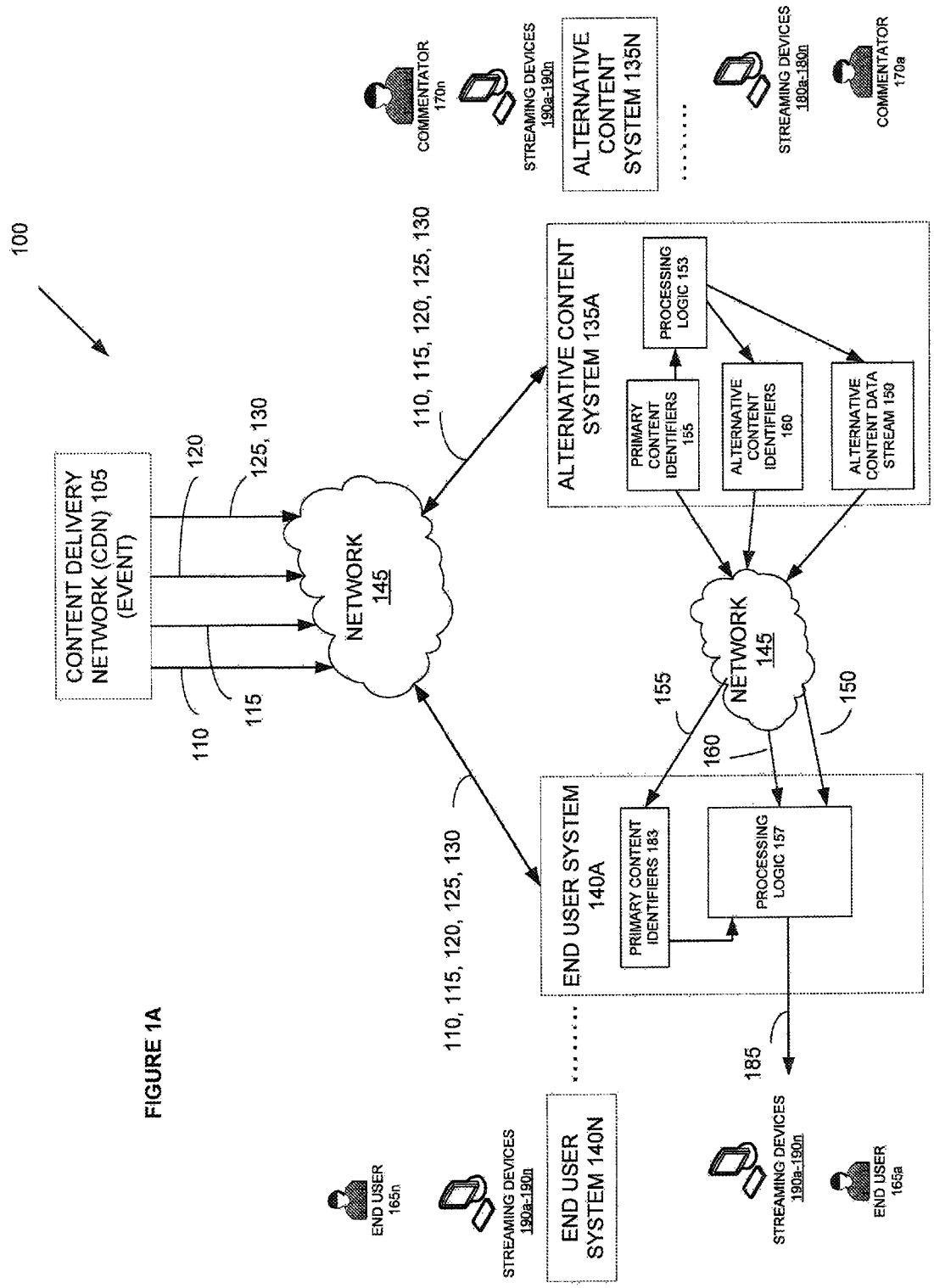
FIG. 1A is a block diagram of one embodiment of a system for synchronizing primary video of live and recorded events with alternative content from a second audio channel or second screen.

FIG. 1A is a block diagram of one embodiment of a system 100 for synchronizing primary video of live and recorded events with alternative audio commentary from a second audio channel or a second screen. The system 100 may include a content delivery network 105 (CDN). The CDN 105 may be configured to deliver a primary content data stream comprising a primary video data stream 110 of a live or recorded video event and/or an associated primary audio data stream 115 of the live or recoded event. The CDN 105 may be further configured to deliver a secondary content data stream 120 and an optional metadata stream 125. The primary audio data stream 115 may be a recording of sound associated with the primary video data stream 110 of the live or recoded event. The secondary content data stream 120 may be a recording of sound associated with, in one example, a play-by-play announcer that comments on the live or recoded event. In one example, the optional metadata stream 125 may provide an out-of-band primary content identifier data stream 130 of periodically transmitted identifiers (e.g., digital fingerprints) that uniquely identify each segment of the primary video data stream 110 and/or primary audio data stream 115. In another example, the primary content identifier data stream 130 may be included in-band within the primary video data stream 110 and/or primary audio data stream 115 (e.g., digital watermarks).

In one example, the primary content identifier data stream 130 may comprise digital fingerprints of each segment of the primary video data stream 110 and/or primary audio data stream 115. A digital fingerprint, as is known in the art, may summarize the values of each of the video pixels of a set of video frames associated with the primary video data stream 110 or may summarize the values of each segment of the primary audio data stream 115. In another example, there is no out-of-band primary content identifier data stream 130. Instead, each segment of the primary video data stream 110 and/or primary audio data stream 115 may have an embedded (in-band) digital watermark. A digital watermark, as is known in the art, may be pixels of a small image that may be inserted, unnoticeable to an end user (e.g., 165a), into the pixels of each frame of the primary video data stream 110 or into the primary audio data stream 115.

The content delivery network server 105 may be configured to deliver the primary video data stream 110, the primary audio data stream 115, the secondary content data stream 120, and the optional metadata stream 125 to one or more alternative content systems 135a-135n and one or more end user systems 140a-140n over a network 145 which may be, but is not limited to, the Internet. Each of the alternative content systems 135a-135n may be configured to substitute an alternative content data stream 150 for the secondary content data stream 120 and deliver the alternative content data stream 150 to the one or more end user systems 140a-140n over the network 145. The alternative content data stream 150 may be at least one of an audio commentary data stream, a video commentary data stream, or a text data stream. The alternative audio commentary data stream may be a color commentary stream, play-by-play commentary stream, one or more external sound tracks (e.g., of a song, a movie, etc.), one or more foreign translations, a voice cast, or other alternative content data stream.

Each of the alternative content systems 135a-135n may be configured to receive the primary content data stream (e.g., the primary video data stream 110 and/or the primary audio data stream 115), the secondary content data stream 120, and the optional metadata stream 125 from the CDN 105. Each of the alternative content systems 135a-135n may be configured to employ processing logic 153 to synchronize the alternative content data stream 150 with the primary video data stream 110 and/or the primary audio data stream 115. Each of the alternative content systems 135a-135n may be configured to employ processing logic 153 to extract primary content identifiers 155 (e.g., digital fingerprints, watermarks, etc.) from the primary content identifier data stream 130, extract alternative content identifiers 160 from the alternative content data stream 150, and synchronize the primary video data stream 110 and/or the primary audio data stream 115 to the alternative content data stream 150 based on the primary content identifiers 155 and the alternative content identifiers 160 using means known in the art. The alternative content systems 135a-135n may be configured to transmit the synchronized alternative content data stream 150, the primary content identifiers 155, and the alternative content identifiers 160 to each of the one or more end user systems 140a-140n.

Each of the alternative content systems 135a-135n may be further configured to permit one or more corresponding end users 165a-165n associated with the one or more end user systems 140a-140n to register with one or more alternative content systems 135a-135n to receive the synchronized alternative content data stream 150. An alternative content system (e.g., 135a) may be configured to provide an event schedule that includes information about one or more events that may be transmitted and may be configured to provide an alternative content data stream 150. The schedule may be searchable and browseable by event type (e.g., sports, concerts, etc.), by performer (e.g., teams, orchestras, artists, etc.), by event time, and may include a list of currently active alternative content systems (e.g., 135a-135d).

An alternative content system (e.g., 135a) may be configured to display alternative content identifiers 160 associated with a commentator (e.g., 170a) associated with the alternative content system (e.g., 135a) and a list of end users 165a-165n that are currently logged into a social network associated with the commentator (e.g., 170a). The alternative content system (e.g., 135a) may be configured to permit the commentator (e.g., 170a) to invite the currently logged-in users (not shown) to the event that the commentator (e.g., 170a) may be announcing. The alternative content system (e.g., 135a) may be configured to permit the commentator (e.g., 170a) to sign-up to announce selected events. The alternative content system (e.g., 135*a*) may be configured to push notifications of availability of a commentator (e.g., 170*a*) for announcing selected events to users of social networks (e.g., Facebook, Twitter, LinkedIn, Google+, etc.) that are currently logged into the end user systems 140*a*-140*n*. The alternative content system (e.g., 135*a*) may be configured to provide statistics for an event that the commentator (e.g., 170*a*) is currently announcing. The alternative content system (e.g., 135*a*) may be configured to permit one or more additional commentators (e.g., 170*b*-170*f*) to join in to announce an event. The commentator (e.g., 170*a*) associated with the alternative content system (e.g., 135*a*) may, for example, provide "play-by-play" commentary while another commentator (e.g., 170*b*) may provide "color commentary" for the same event. The alternative content system (e.g., 135*a*) may be configured to provide the commentator (e.g. 170*a*) with one or more audio/video streaming devices 180*a*-180*n*. The streaming devices 180*a*-180*n* may comprise a display for receiving and displaying the primary video data stream 110 and a microphone or head set for receiving the primary audio data stream 115 and for generating the alternative content data stream 150.

Each of the one or more end user systems 140*a*-140*n* may be configured to receive the primary content data stream (e.g., the primary video data stream 110 and/or the primary audio data stream 115), the secondary content data stream 120, and the optional metadata stream 125 from the CDN 105. Each of the end user systems 140*a*-140*n* may be further configured to receive the synchronized alternative content data stream 150, the primary content identifiers 155, and the alternative content identifiers 160 from the alternative content system (e.g., 135*a*). Processing logic 157 of an end user system (e.g., 140*a*) may receive or extract in-band or out-of-band second primary content identifiers 183 received from the CDN 105, receive or extract the in-band or out-of-band primary content identifiers 155 received from the alternative content system (e.g., 135*a*) and originating from the CDN 105, and receive or extract the alternative content identifiers 160 from the synchronized alternative content data stream 150 of the secondary commentary system (e.g., 135*a*). Each of the end user systems 140*a*-140*n* may be configured to employ the processing logic 157 to further synchronize the synchronized alternative content data stream 150 with the primary video data stream 110 and/or primary audio data stream 115 based on the primary content identifiers 155, the second primary content identifiers 183, and the alternative content identifiers 160 by means known in the art. The end user system (e.g., 140*a*) may be configured to employ the processing logic 157 to combine the further synchronized primary video data stream 110 and/or primary audio data stream 115 with the further synchronized alternative content data stream 150 in place of the secondary content data stream 120 to produce a combined signal stream 185. The combined signal stream 185 may be streamed to one or more audio/video streaming devices 190*a*-190*n* to an end user (e.g., 165*a*). The streaming devices 190*a*-190*n* may comprise a display for receiving and displaying the primary video data stream 110 and a microphone or head set for receiving the primary audio data stream 115 and the alternative content data stream 150.

Each of the alternative content systems 135*a*-135*n* may be further configured to permit the end users 165*a*-165*n* associated with the one or more end user systems 140*a*-140*n* to register with one or more alternative content systems 135*a*-135*n* to receive the synchronized alternative content data stream 150. An end user system (e.g., 140*a*) may be configured to provide an end user (e.g., 165*a*) with an event schedule that comprises information about one or more events that may be received from the CDN 105. The schedule may be searchable and browseable by event type (e.g., sports, concerts, etc.), by performer (e.g., teams, orchestras, artists), by event time, and may include a list of currently active alternative content systems (e.g., 135*a*-135*x*). The end user system (e.g., 140*a*) may be configured to display to an end user (e.g., 165*a*) a list of end users (e.g., 165*a*-165*x*) that are currently logged into a social network associated with the end user (e.g., 165*a*). The end user system (e.g., 140*a*) may be configured to permit the end user (e.g., 165*a*) to invite the currently logged in end users (e.g., 165*a*-165*x*) to receive a synchronized alternative content data stream 150 of a selected alternative content system (e.g., 135*a*). The end user system (e.g., 140*a*) may be configured to permit the end user (e.g., 165*a*) to receive push notifications of the availability of alternative content systems 135*a*-135*n* for selected and upcoming events and to other users of a social associated with the end users (e.g., 165*a*-165*n*) (e.g., Facebook, Twitter, LinkedIn, Google+, etc.) that are currently logged into the end user systems 140*a*-140*n*. An end user system (e.g., 140*a*) may be configured to permit the end user 165*a* to message a commentator (e.g., 170*a*) of an alternative content systems (e.g., 135*a*) and other end users (e.g., 165*a*-165*n*) in a selected social network of the end user (e.g., 165*a*). The end user system (e.g., 140*a*) may be configured to permit the end users (e.g., 165*a*-165*n*) to microblog about the events that they may be currently listening to and/or viewing. Others of the end users (e.g., 165*a*-165*n*) that may be listening to the same event may limit receipt of such microblogs (e.g., exclude end users 165*b*-165*d* that are not in their social network).

Figure 1B:
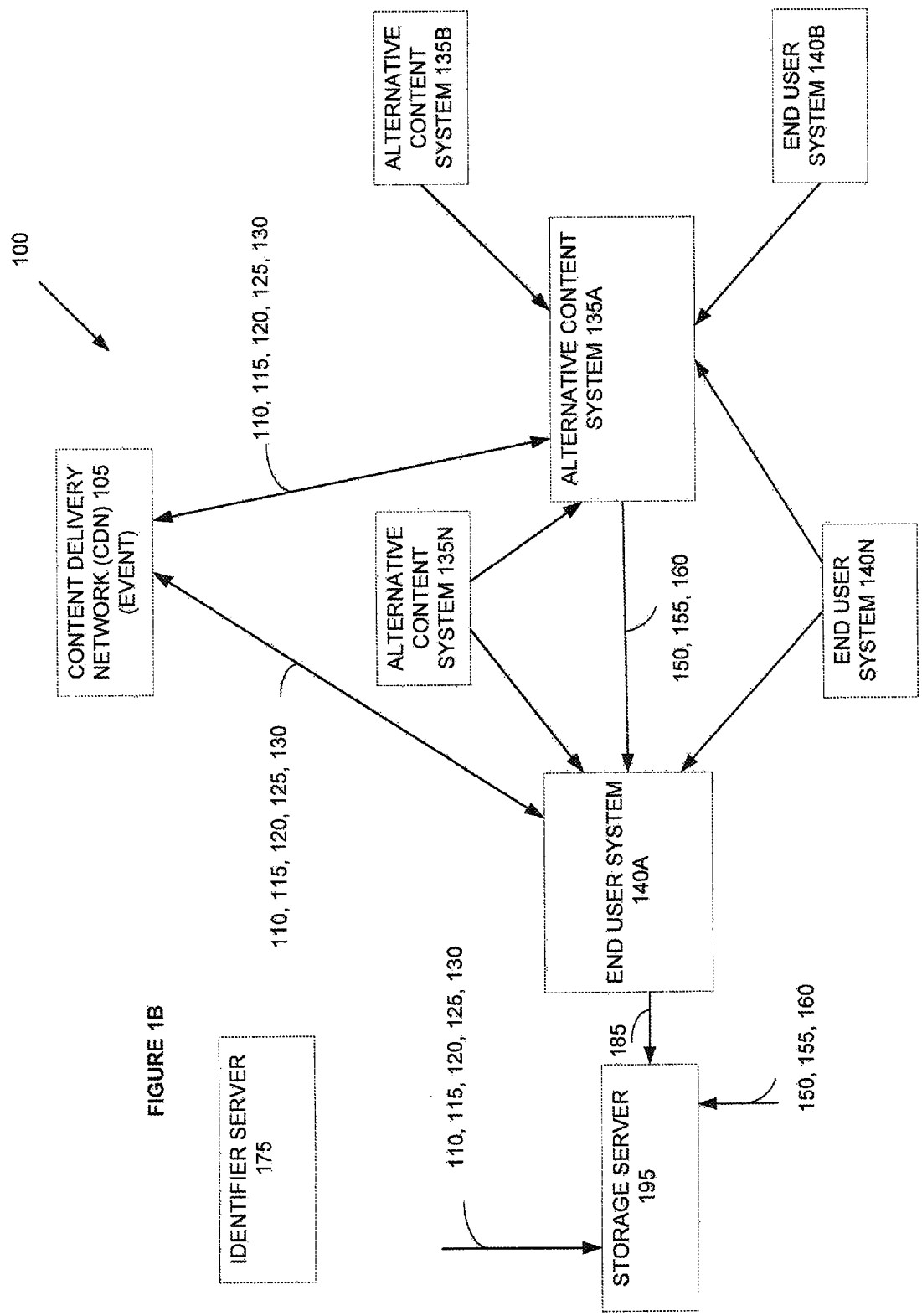
FIG. 1B is a block diagram of another embodiment of a system for synchronizing primary video of live and recorded events with alternative content from a second audio channel or second screen.

The system of FIG. 1A may be subject to numerous variations as shown in FIG. 1B. FIG. 1B is a block diagram of another embodiment of a system for synchronizing primary video of live and recorded events with alternative audio commentary from a second audio channel or second screen. The system 100 may include substantially the same elements having substantially the same functionality as elements designated with like numerals of FIG. 1 except for the addition of an identifier server 175 and a storage server 195. The identifier server 175 may be configured to provide the identifiers comprising fingerprints and/or watermarks employed by any of the signals requiring synchronization within the alternative content systems 135*a*-135*n* and/or the end user systems 140*a*-140*n*. The storage server 195 or the CDN 105 may be configured to store and any combination of the signals 110, 115, 120, 125, 130 emanating from the CDN 105 comprising content and/or identifier streams, any of the signals emanating from the alternative content systems 135*a*-135*n* (150, 155, 160) and/or the combined signal stream 185 emanating from the end user systems 140*a*-140*n*. Any combination of the stored signals 110, 115, 120, 125, 130, 150, 155, 160, 185 may be employed as inputs for any other of the alternative content systems 135*a*-135*n* and/or the end user systems 140*a*-140*n*. The combinations of the stored signals 110, 115, 130, 125, 130, 150, 155, 160, 185 may be stored in the storage server 195 or the CDN 105 either as separate tracks or in combination.

An end user system (e.g., 140*a*) may multiplex and synchronize any combination of primary content data streams and alternative content data streams from one or more of the alternative content systems 135*a*-135*n* or other end user systems 140*b*-140*n*. The end user system (e.g., 140*a*) may provide its combined signal stream 185 as a primary content data stream or as an alternative content data stream to another of the alternative content systems 135a-135n or other end user systems 140b-140n.

An alternative content system (e.g., 135a) may multiplex and synchronize any combination of primary content data streams and alternative content data streams from one or more of other alternative content systems 135b-135n or the end user systems 140a-140n. The alternative content system (e.g., 135a) may provide its output signal streams 150, 155, 160 as a primary content data streams or as an alternative content data streams to another of the other alternative content systems 135b-135n or the end user systems 140a-140n.

In one example, the alternative content system (e.g., 135a) and/or the end user system (e.g., 140a) may be configured to add or drop various combinations of color commentary data streams, play-by-play data streams, sound tracks, foreign translations, voice casts, and other primary and/or alternative content. The alternative content system (e.g., 135a) and/or the end user system (e.g., 140a) may be configured to synchronize these various combinations of data streams with the primary content data streams.

In an example, the alternative content data stream 150, 155, 160 may be second alternative audio commentary data streams. The second alternative audio commentary streams may be color commentary data streams, play-by-play commentary streams, one or more external sound tracks, one or more foreign translations, voice casts, etc. In one example, the end user system (e.g., 135a) may be configured to add or drop various combinations of color commentary data streams, play-by-play data streams, sound tracks, or other primary content and/or alternative content. The end user system (e.g., 135a) may be configured to synchronize these various combinations of data streams with primary content streams (e.g., video, audio, data, etc.). In another example, the combined output stream(s) 185 from an end user system (e.g., 135a) may serve as input streams to another alternative content system (e.g., 135b), serve as primary content streams to another alternative content system (e.g., 135n) or end user system (140n), and/or be stored on the storage server 195 or the CDN 105. In an example, the event may be a live event or a recorded event. The event may be a sporting event, an entertainment event, a video game, a sound track, a voice cast, etc.

Figure 2A:
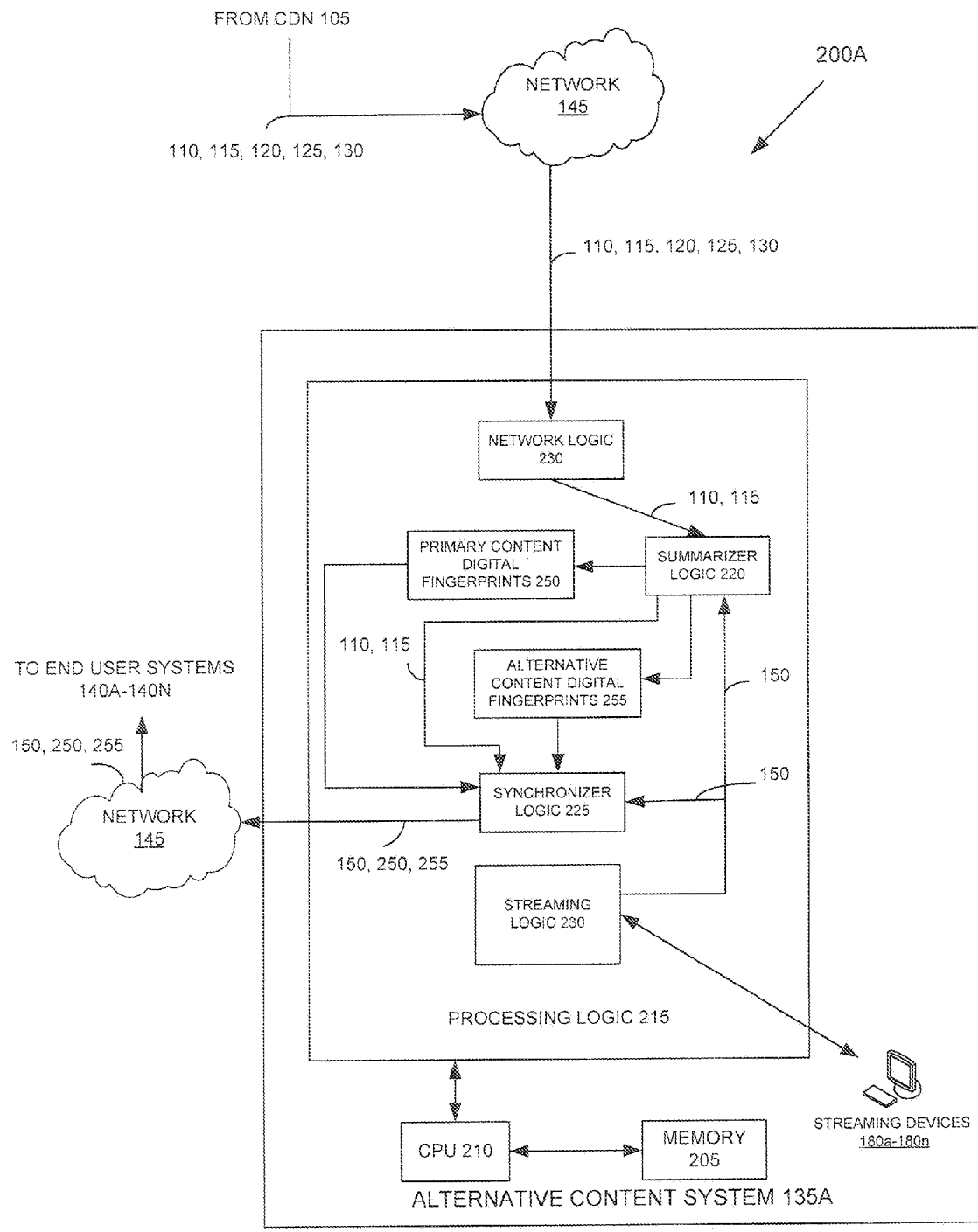
FIG. 2A is a block diagram of one embodiment of an alternative content system employing digital fingerprints as identifiers.
Figure 2A:

FIG. 2A is a block diagram 200A of one embodiment of an alternative content system (e.g., 135a) employing digital fingerprints as identifiers. The alternative content system (e.g., 135a) may comprise memory 205 and a processing device 210 coupled to the memory 205. The processing device 210 may retrieve from the memory 205 instructions comprising operations to be executed by processing logic 215 of the processing device 210. The processing logic 215 may comprise summarizer logic 220, synchronizer logic 225, network logic 230, and streaming logic 235. The network logic 230 may be configured to receive the primary content data stream (e.g., the primary video data stream 110 and/or the primary audio data stream 115), the secondary content data stream 120, and an optional metadata stream 125 (including the primary content identifier data stream 130) over a network 145 from the CDN 105. The alternative content system (e.g., 135a) may further comprise a plurality of streaming devices 180a-180n that may comprise a video display, an audio receiver, and an audio transmitter. The streaming logic 235 may provide an alternative content data stream 150 while permitting the commentator (e.g., 170a) to view the primary video data stream 110 and hear the primary audio data stream 115.

In one example, summarizer logic 220 of the alternative content system (e.g., 135a) may create a plurality of primary content digital fingerprints 250 based on summaries of segments of the primary video data stream 110 and/or primary audio data stream 115. Summarizer logic 220 of the alternative content system (e.g., 135a) may create a plurality of alternative content digital fingerprints 255 associated with the alternative content data stream 150. Synchronizer logic 225 of the alternative content system (e.g., 135a) may synchronize the primary video data stream 110 and/or primary audio data stream 115 to the alternative content data stream 150 based on the plurality of primary content digital fingerprints 250 and the plurality of alternative content digital fingerprints 255 by means known in the art. Network logic 230 of the secondary commentary system (e.g., 135a) may be configured to transmit the synchronized alternative content data stream 150 to the end user systems 140a-140n. Network logic 230 may be further configured to transmit the plurality of primary content digital fingerprints 250 and the plurality of alternative content digital fingerprints 255 over the network 145 to each of the end user systems 140a-140n.

Figure 2B:
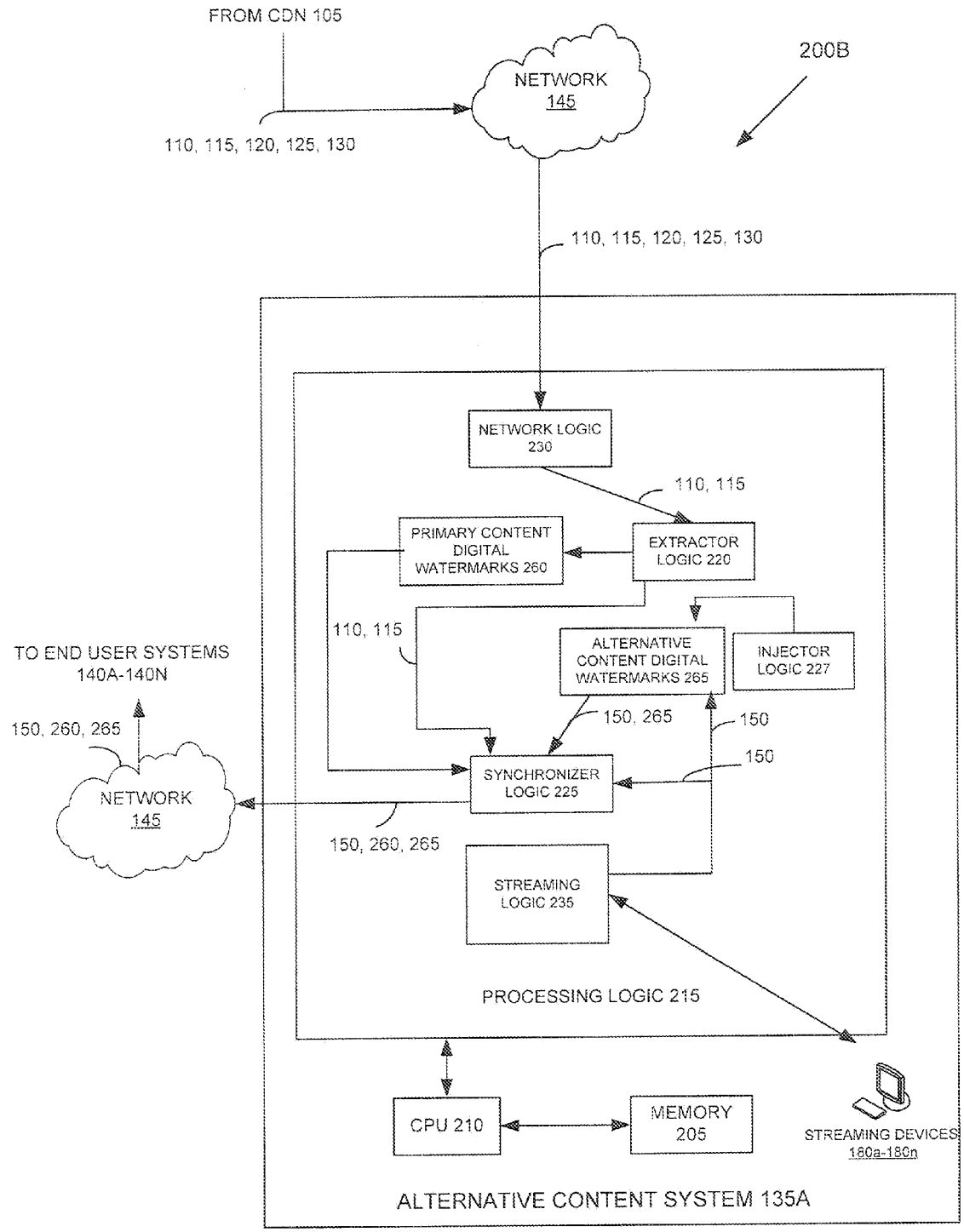
FIG. 2B is a block diagram of one embodiment of an alternative content system employing digital watermarks as identifiers.
Figure 2B:

FIG. 2B is a block diagram 200B of one embodiment of an alternative content system (e.g., 135a) employing digital watermarks as identifiers. The alternative content system (e.g., 135a) may comprise memory 205 and a processing device 210 coupled to the memory 205. The processing device 210 may retrieve from the memory 205 instructions comprising operation to be executed by processing logic 215 of the processing device 210. Processing logic 215 may comprise extractor logic 220, synchronizer logic 225, injector logic 227, network logic 230, and streaming logic 235. The network logic 230 may receive the primary content data stream (e.g., the primary video data stream 110 and/or the primary audio data stream 115), the secondary content data stream 120, and an optional metadata stream 125 (including the primary content identifier data stream 130) over a network 145 from the CDN 105. The alternative content system (e.g., 135a) may further comprise a plurality of streaming devices 180a-180n that may comprise a video display, an audio receiver, and an audio transmitter to permit a commentator (e.g., 170a). The streaming logic 235 provides an alternative content data stream 150 while permitting the commentator (e.g., 170a) to view the primary video data stream 110 and hear the primary audio data stream 115.

In one example, extractor logic 220 of the alternative content system (e.g., 135a) may extract a plurality of primary content digital watermarks 260 from the primary video data stream 110 and/or primary audio data stream 115 that was injected into the primary video data stream 110 and/or primary audio data stream 115 in the CDN 105. Injector logic 227 in the alternative content system (e.g., 135a) may inject a plurality of alternative content digital watermarks 265 into the alternative content data stream 150 and may be associated with the alternative content data stream 150. Synchronizer logic 225 in the alternative content system (e.g., 135a) may synchronize the primary video data stream 110 and/or primary audio data stream 115 to the alternative content data stream 150 based on the plurality of primary content digital watermarks 260 and the injected plurality of alternative content digital watermarks 265 by means known in the art. Network logic 230 of the secondary commentary system (e.g., 135a) may be configured to transmit the synchronized alternative content data stream 150 to the end user systems 140a-140n. Network logic 230 may be further configured to transmit the plurality of primary content digital watermarks 260 and the plurality of alternative content digital watermarks 265 over the network 145 to each of the one or more end user systems 140a-140n.

Figure 3A:
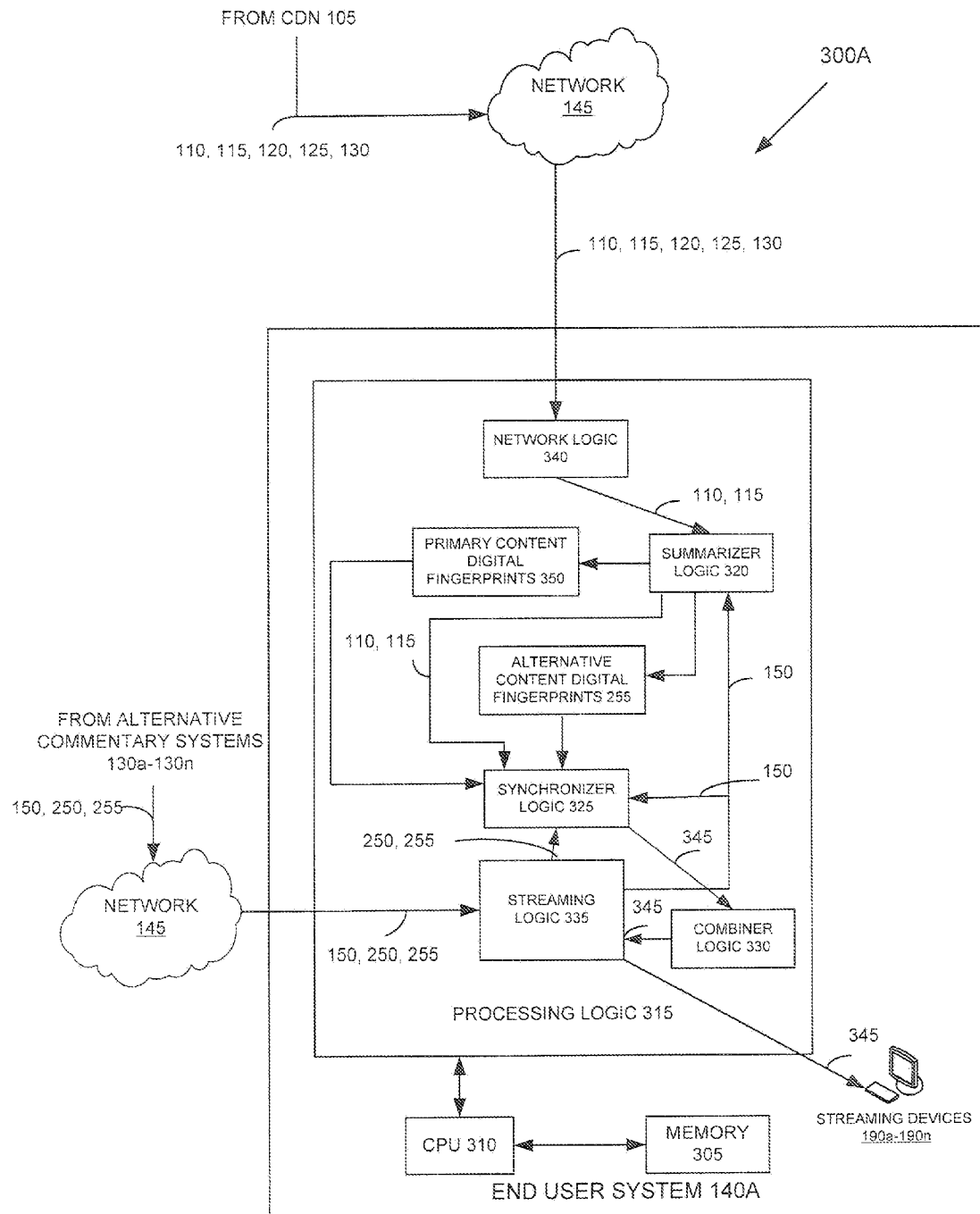
FIG. 3A is a block diagram of one embodiment of an end user system employing digital fingerprints as identifiers.
Figure 3A:

FIG. 3A is a block diagram 300A of one embodiment of an end user system (e.g., 140a) employing digital fingerprints as identifiers. The end user system (e.g., 140a) may comprise memory 305 and a processing device 310 coupled to the memory 305. The processing device 310 may retrieve from the memory 305 instructions comprising operation to be executed by processing logic 315 of the processing device 310. The processing logic 315 may comprise summarizer logic 320, synchronizer logic 325, combiner logic 330, streaming logic 335, and network logic 340. The network logic 340 may be configured to receive the primary content data stream (e.g., the primary video data stream 110 and/or the primary audio data stream 115), the secondary content data stream 120, and the optional metadata stream 125 over the network 145 from the CDN 105. The end user system (e.g., 140a) may be further configured to receive the alternative audio data stream 150, the plurality of primary digital fingerprints 250, and the plurality of alternative content digital fingerprints 255 from the alternative content system (e.g., 135a). The end user system (e.g., 140a) may further comprise a plurality of streaming devices 190a-190n that may comprise a video display, an audio receiver, and an audio transmitter to permit an end user (e.g., 165a) to view and hear, respectively, the primary video data stream 110 synchronized to the alternative content data stream 150 streamed by the streaming logic 335.

In one example, summarizer logic 320 of the end user system (e.g., 140a) may extract a second plurality of primary content digital fingerprints 350 based on summaries of segments of the primary video data stream 110 and/or primary audio data stream 115 received from the CDN 105. Summarizer logic 320 may receive or extract the plurality of alternative content digital fingerprints 255 associated with the alternative content data stream 150. Summarizer logic may further receive or extract the plurality of primary digital fingerprints 250 associated with the primary video data stream 110 and/or primary audio data stream 115 received from the alternative content system (e.g., 135a). Synchronizer logic 325 of the end user system (e.g., 140a) may synchronize the primary video data stream 110 and/or primary audio data stream 115 received from the CDN 105 to the alternative content data stream 150 based on the plurality of primary digital fingerprints 250, the plurality of alternative content digital fingerprints 255, and the second plurality of primary digital fingerprints 350 by means known in the art.

Combiner logic 330 in the end user system (e.g., 140a) may be configured to combine the further synchronized primary video data stream 110 and/or primary audio data stream 115 with the further synchronized alternative content data stream 150 in place of the secondary content data stream 120 to produce a total signal stream 345. The streaming logic 335 may be configured to stream the total signal stream 345 to the display for the primary video data stream 110 and a microphone or head set for the alternative content data stream 150 and the primary audio data stream 115 for viewing and listening, respectively, by the end user (e.g., 165a).

Figure 3B:
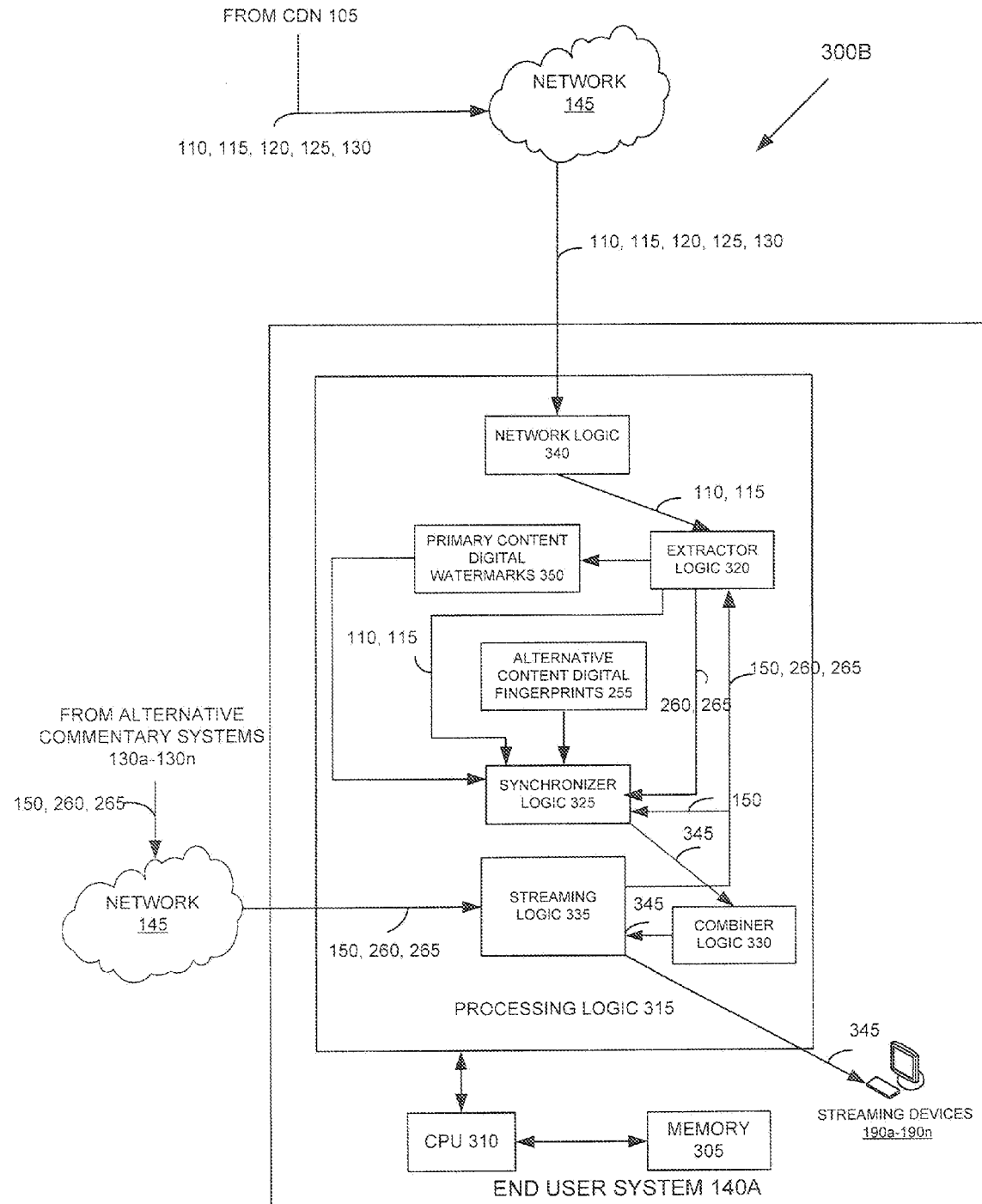
FIG. 3B is a block diagram of one embodiment of an end user system employing digital watermarks as identifiers.

FIG. 3B is a block diagram 300B of one embodiment of an end user system (e.g., 140a) employing digital watermarks as identifiers. The end user system (e.g., 140a) may comprise memory 305 and a processing device 310 coupled to the memory 305. The processing device 310 may retrieve from the memory 305 instructions comprising operation to be executed by processing logic 315 of the processing device 310. The processing logic 315 comprises extractor logic 320, synchronizer logic 325, combiner logic 330, streaming logic 335, and network logic 340. The network logic 340 may receive the primary content data stream (e.g., the primary video data stream 110 and/or the primary audio data stream 115), the secondary content data stream 120, and the optional metadata stream 125 (including the primary content identifier data stream 130) over a network 145 from the CDN 105. The network logic 340 may be further configured to receive the alternative content data stream 150, a plurality of primary content digital watermarks 260, and the plurality of alternative content digital watermarks 265 from the alternative content system (e.g., 135a). The end user system (e.g., 140a) may further comprise a plurality of streaming devices 190a-190n that may comprise a video display, an audio receiver, and an audio transmitter to permit an end user (e.g., 165a) to view and hear, respectively, the primary video data stream 110 synchronized to the alternative content data stream 150 streamed by the streaming logic 335.

In one example, extractor logic 320 of the end user system (e.g., 140a) may extract a second plurality of primary content digital watermarks 350 based on summaries of segments of the primary video data stream 110 and/or primary audio data stream 115 received from the CDN 105. Extractor logic 320 may receive or extract the plurality of alternative content digital watermarks 265 associated with the alternative content data stream 150. Extractor logic may further receive or extract the plurality of primary content digital watermarks 260 associated with the primary video data stream 110 and/or primary audio data stream 115 received from the alternative content system (e.g., 135a). Synchronizer logic 325 of the end user system (e.g., 140a) may synchronize the primary video data stream 110 and/or primary audio data stream 115 received from the CDN 105 to the alternative content data stream 150 based on the plurality of primary content digital watermarks 260, the plurality of alternative content digital watermarks 265, and the second plurality of primary content digital watermarks 350 by means known in the art.

Combiner logic 330 in the end user system (e.g., 140a) may be configured to combine the further synchronized primary video data stream 110 and/or primary audio data stream 115 with the further synchronized alternative content data stream 150 in place of the secondary content data stream 120 to produce a total signal stream 345. The streaming logic 335 may be configured to stream the total signal stream 345 to the display for the primary video data stream 110 and a microphone or head set for the alternative audio data stream 150 and the primary audio data stream 115 for viewing and listening, respectively, by the end user (e.g., 165a).

Figure 4:
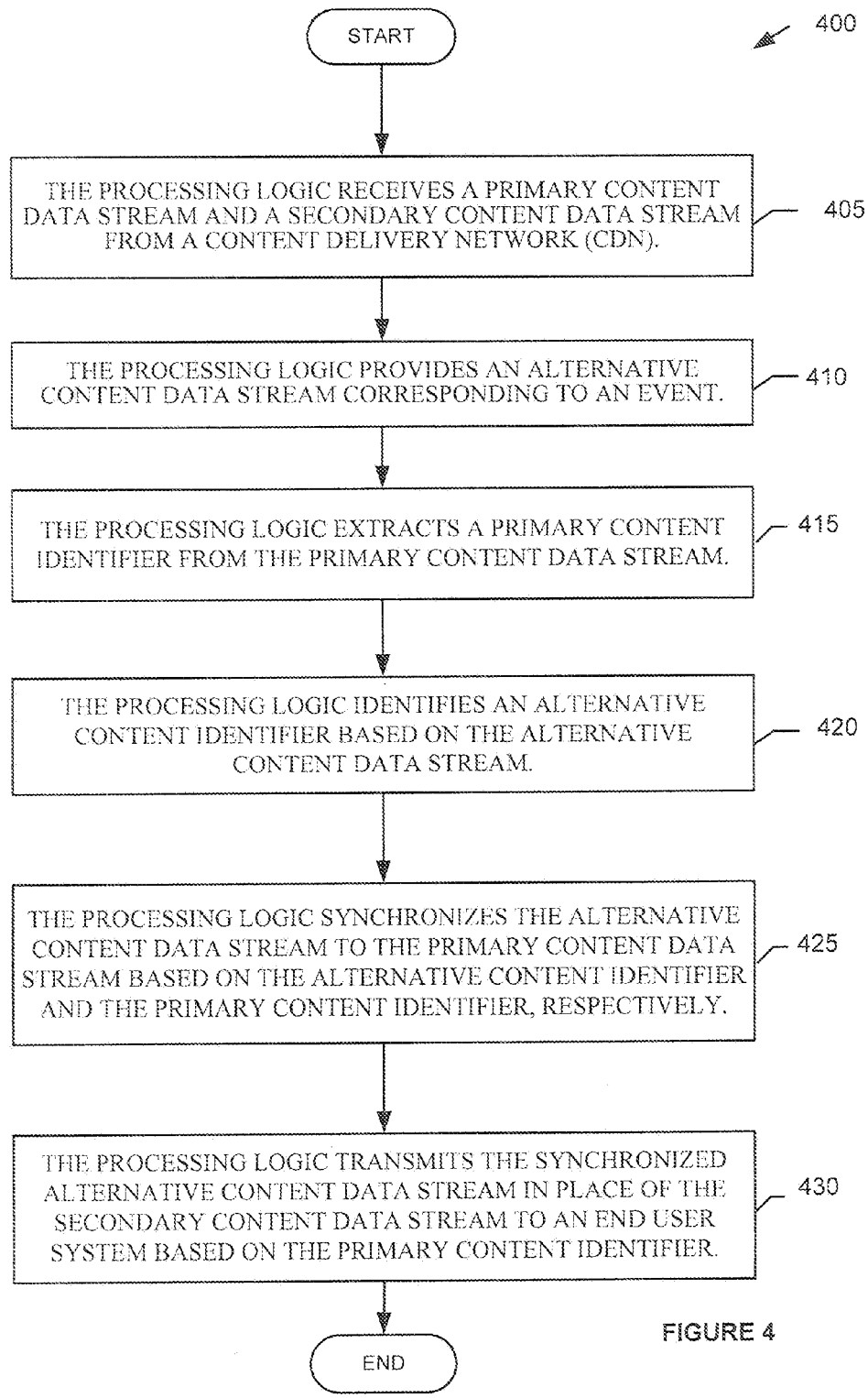
FIG. 4 is a flow diagram illustrating an example of a method for synchronizing a primary video data stream of live and recorded events with an alternative content data stream from the perspective of the alternative content system of FIGS. 1A and 1B.

FIG. 4 is a flow diagram illustrating an example of a method 400 for synchronizing a primary video data stream 110 of live and recorded events with an alternative content data stream 150 from the perspective of an alternative content system (e.g., 135a) of FIGS. 1A and 1B. The method 400 may be performed by a computer system 600 of FIG. 6 and may comprise hardware (e.g., circuitry, dedicated logic, programmable logic, microcode, etc.), software (e.g., instructions run on a processing device), or a combination thereof. In one example, the method 400 is performed by processing logic 215 of the alternative content system (e.g., 135a) of FIGS. 1A, 1B, 2A, and 2B.

In one embodiment, method 400 begins when, at block 405, the processing logic 215 receives a primary content data stream (e.g., the primary video data stream 110/primary audio data stream 115) and a secondary content data stream 120 from a content delivery network (CDN) 105. The primary video data stream 110/primary audio data stream 115 and the secondary content data stream 120 are both associated with an event. In an example, the event may be a live event or a recorded event. In an example, the event may be a sporting event, an entertainment event, or a video game, a sound track, a voice cast, (e.g., of a song, a movie, etc.), etc. In an example, the primary video data stream 110/primary audio data stream 115 may corresponds to one of a video data stream, an audio data stream, or a metadata stream corresponding to the video data stream or the audio data stream.

At block 410, the processing logic 215 provides an alternative content data stream 150 corresponding to the event. The alternative content data stream 150 corresponds to one of a video data stream, an audio data stream, or a metadata stream. In one example, the alternative content data stream 150 may be a color commentary stream. In another example, the alternative content data stream 150 may be a play-by-play commentary stream. In another example, the alternative content data stream 150 may be sound tracks (e.g., of a song, a movie, etc.), foreign translations, voice casts, etc.

At block 415, the processing logic 215 extracts a primary content identifier 155 from the primary content data stream (e.g., the primary video data stream 110/primary audio data stream 115). At block 420, the processing logic 215 identifies or generates an alternative content identifier 160 based on the alternative content data stream 150. The primary content identifier 155 uniquely identifies a portion of the primary content data stream (e.g., the primary video data stream 110/primary audio data stream 115). The alternative content identifier 160 uniquely identifies a portion of the alternative content data stream 150. In one example, the primary content identifier 155 and the alternative content identifier 155 may be digital watermarks. In another example, the primary content identifier 155 and the alternative content identifier 155 may be digital fingerprints.

At block 425, the processing logic 215 synchronizes the alternative content data stream 150 to the primary content data stream (e.g., the primary video data stream 110/primary audio data stream 115) based on the alternative content identifier 160 and the primary content identifier 155, respectively. At block 430, the processing logic 215 transmits the synchronized alternative content data stream 150 in place of the secondary content data stream 120 to an end user system (e.g. 140a) based on the primary content identifier 155. The processing logic 215 transmits the synchronized alternative content data stream 150 to the end user system (e.g. 140a) based on the primary content identifier 155 by comparing the primary content identifier 155 to the alternative content identifier 160. When the primary content identifier 155 and the alternative content identifier 160 are equivalent, the processing logic 215 permits the transmission of the synchronized alternative content data stream 150 to the end user system (e.g. 140a). When the primary content identifier 155 and the alternative content identifier 160 are not equivalent, processing logic 215 inhibits the transmission of the synchronized alternative content data stream 150 to the end user system (e.g., 140a). In another example, the processing logic 415 may further transmit the primary content identifier 155 and the alternative content identifier 160 to the end user system (e.g., 140a).

In an example, when the primary content identifier 155 and the alternative content identifier 160 are digital fingerprints, the processing logic may identify (e.g., generate or inject into the primary video data stream 110/primary audio data stream 115) a third identifier 405 corresponding to the primary content identifier 155, where the third identifier is a digital watermark and further transmit the alternative content identifier 160 and the third identifier 405 to the end user system (e.g., 140a).

Figure 5:
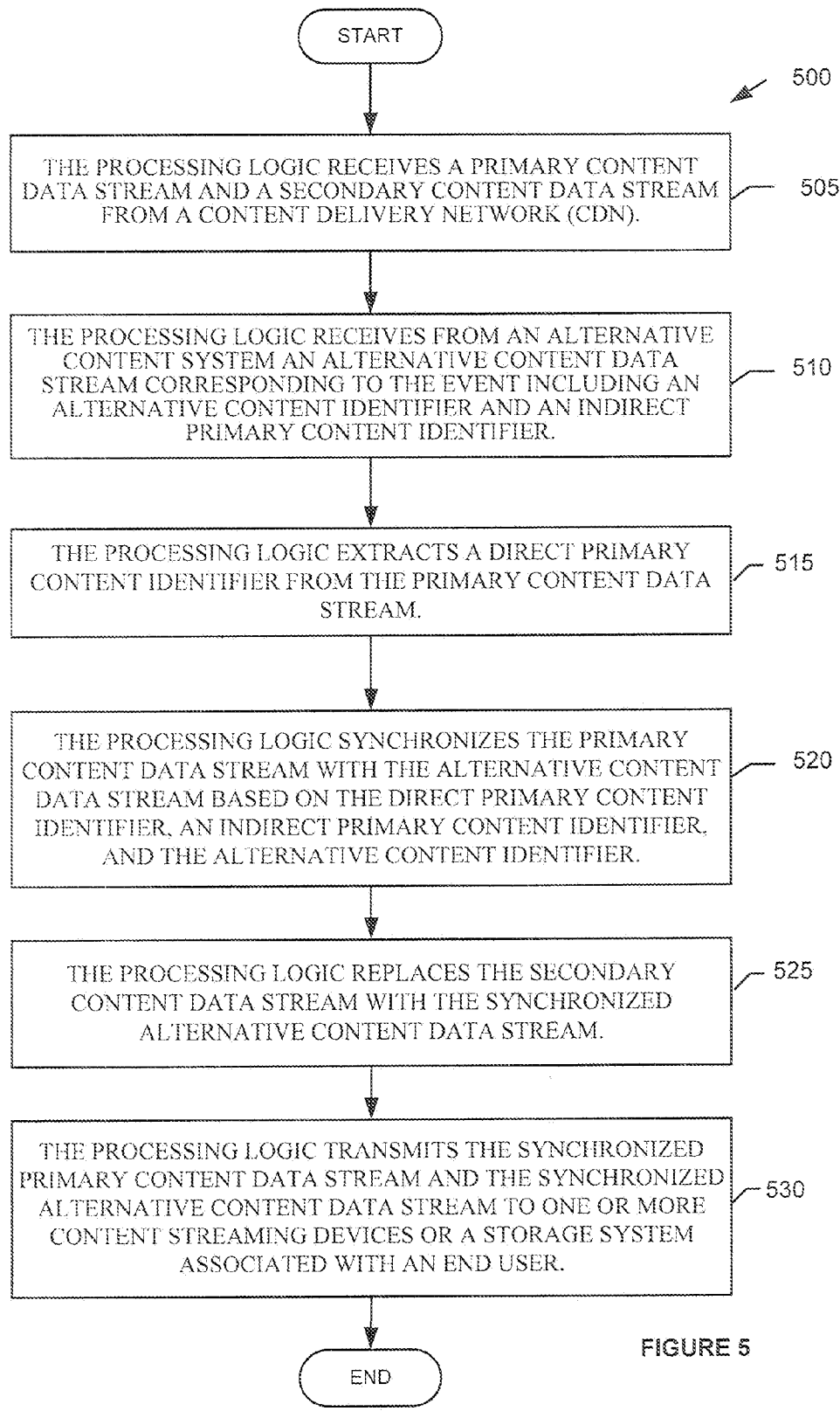
FIG. 5 is a flow diagram illustrating an example of a method for synchronizing a primary video data stream of live and recorded events with an alternative content data stream from the perspective of the end user system of FIGS. 1A and 1B.

FIG. 5 is a flow diagram illustrating an example of a method 500 for synchronizing a primary video data stream 110 of live and recorded events with an alternative content data stream 150 from the perspective of an end user system (e.g., 140a) of FIGS. 1A and 1B. The method 500 may be performed by a computer system 600 of FIG. 6 and may comprise hardware (e.g., circuitry, dedicated logic, programmable logic, microcode, etc.), software (e.g., instructions run on a processing device), or a combination thereof. In one example, the method 500 is performed by processing logic 315 of the end user system (e.g., 140a) of by processing logic 215 of the alternative content system (e.g., 135a) of FIGS. 1A, 1B, 3A, and 3B.

In one embodiment, method 500 begins when, at block 505, the processing logic 315 receives a primary content data stream (e.g., the primary video data stream 110/primary audio data stream 115) and a secondary content data stream 120 from a content delivery network (CDN) 105. The primary video data stream 110/primary audio data stream 115 may each associated with an event. The event may be a live event or a recorded event. The event may be a sporting event, an entertainment event, a video game, sound tracks (e.g., of a song, a movie, etc.), voice casts, etc. The primary video data stream 110/primary audio data stream 115 includes a direct primary content identifier 155. The direct primary content identifier 155 uniquely identifies a portion of the primary video data stream 110/primary audio data stream 115 received directly from the CDN 105.

At block 510, the processing logic 315 receives from an alternative content system (e.g., 135a) an alternative content data stream 150 corresponding to the event. The alternative content data stream 150 includes an alternative content identifier 160 and an indirect primary content identifier 180. The alternative content identifier 160 uniquely identifies a portion of the alternative content data stream 150. The indirect primary content identifier 180 may be associated with the primary video data stream 110/primary audio data stream 115 associated with the event and received indirectly from the CDN 105 through the alternative content system (e.g., 135a). The alternative content data stream 150 may be synchronized to the indirectly received primary video data stream 110/primary audio data stream 115.

In an example, the direct primary content identifier 155, the indirect primary content identifier 180, and the alternative content identifier 160 may be digital watermarks or digital fingerprints.

In an example, the primary video data stream 110/primary audio data stream 115 may correspond to one of a video data stream an audio data stream, or metadata stream. The alternative content data stream 150 may correspond to one of a video data stream, an audio data stream, or a metadata stream corresponding to the video data stream or the audio data stream.

In an example, the alternative content data stream 150 may be a second audio commentary stream. The second audio commentary stream may be a color commentary stream or a play-by-play commentary stream, sound tracks (e.g., of a song, a movie, etc.), foreign translations, voice casts, etc.

At block 515, the processing logic 315 extracts the direct primary content identifier 155 from the primary content data stream (e.g., the primary video data stream 110/primary audio data stream 115). The processing logic 515 further extracts or receives the alternative content identifier 160 and extracts or receives the indirect primary content identifier 180 from the alternative content data stream 150.

At block 520, the processing logic 315 synchronizes primary content data stream (e.g., the primary video data stream 110/primary audio data stream 115) with the alternative content data stream 150 based on the direct primary content identifier 155, the indirect primary content identifier 180, and the alternative content identifier 160. At block 525, the processing logic 315 replaces the secondary content data stream 120 with the synchronized alternative content data stream 150.

At block 530, the processing logic 315 transmits the synchronized primary content data stream (e.g., the primary video data stream 110/primary audio data stream 115) and the synchronized alternative content data stream 150 to one or more audio/video streaming devices 190a-190n and/or a storage server 195 associated with the end user (e.g., 165a).

In an example, to permit a second commentator (not shown) to provide commentary (e.g., color commentary) along with a first commentator (e.g., play-by-play commentary), the processing logic may receive a second alternative content data stream (not shown) corresponding to the event. The processing logic 315 may generate a second alternative content identifier based on the second alternative content data stream. The processing logic 315 may synchronize the second alternative content data stream to the primary content data stream (e.g., the primary video data stream 110/primary audio data stream 115) based on the second alternative content identifier and the direct primary content identifier 155, respectively. The processing logic 315 may transmit the synchronized second alternative content data stream to the one or more receiving one or more audio/video streaming devices 190a-190n associated with the end user (e.g., 165a).

Figure 6:
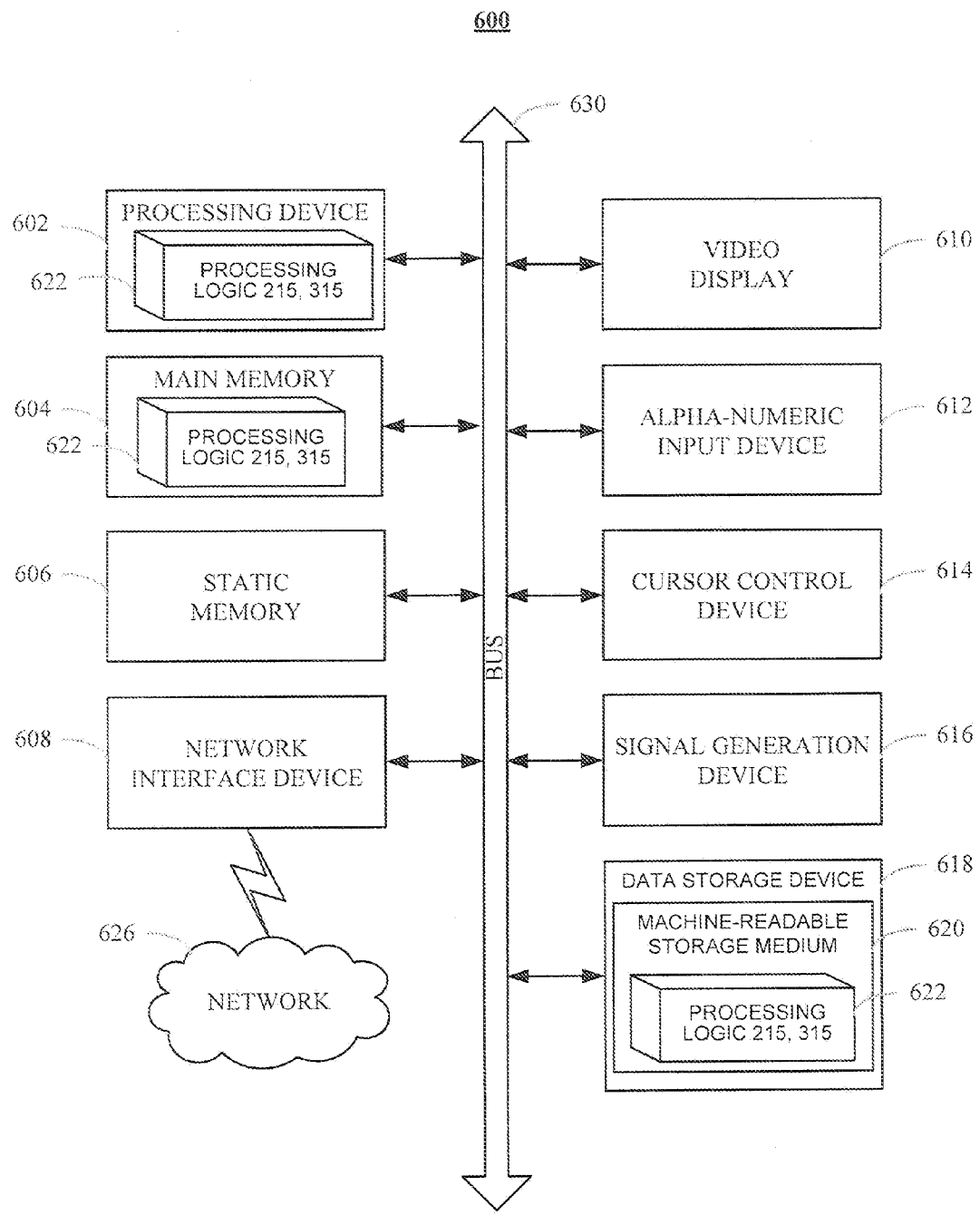
FIG. 6 illustrates a diagrammatic representation of a machine in the exemplary form of a computer system within which a set of instructions, for causing the machine to perform any one or more of the methodologies discussed herein, may be executed.

FIG. 6 illustrates a diagrammatic representation of a machine in the example form of a computer system 400 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processing logic 215, 315 shown in FIGS. 2A-3B may be executed by processor 602 configured to perform the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

A drive unit 616 may include a computer-readable medium 624 on which is stored one or more sets of instructions (e.g., instructions of the processing logic 215, 315 of FIGS. 2A-3B) embodying any one or more of the methodologies or functions described herein. The instructions of the processing logic 215, 315 of FIGS. 2A-3B may also reside, completely or at least partially, within the main memory 604 and/or within the processor 602 during execution thereof by the computer system 600, the main memory 604 and the processor 602 also constituting computer-readable media. The instructions of the processing logic 215, 315 of FIGS. 2A-3B may further be transmitted or received over a network 626 via the network interface device 622.

While the computer-readable storage medium 624 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by a processing device, a direct primary content data stream and a secondary content data stream, both the direct primary content data stream and the secondary content data stream associated with an event, the direct primary content data stream comprising a direct primary content identifier;
receiving, by the processing device from an alternative content system, an alternative content data stream corresponding to the event, the alternative content data stream comprising an alternative content identifier and an indirect primary content identifier, the indirect primary content identifier associated with an indirect primary content data stream associated with the event, the indirect primary content identifier and the indirect primary content data stream corresponding to the direct primary content identifier and the direct primary content data stream, respectively, as received by the alternative content system, wherein the alternative content data stream is synchronized to the indirect primary content data stream;
extracting the direct primary content identifier from the direct primary content data stream;
extracting the alternative content identifier and the indirect primary content identifier from the alternative content data stream;
synchronizing, by the processing device, the indirect primary content data stream with the alternative content data stream based on the direct primary content identifier, the indirect primary content identifier, and the alternative content identifier, wherein the direct primary content identifier, the indirect primary content identifier, and the alternative content identifier comprise digital watermarks or digital fingerprints;
replacing the secondary content data stream with the synchronized alternative content data stream; and
transmitting the synchronized direct primary content data stream and the synchronized alternative content data stream.

2. The method of claim 1, further comprising:
receiving a second alternative content data stream corresponding to the event;
identifying a second alternative content identifier based on the second alternative content data stream;
synchronizing, by the processing device, the second alternative content data stream to the primary content data stream based on the second alternative content identifier and the direct primary content identifier, respectively; and
transmitting the synchronized second alternative content data stream.

3. The method of claim 1, wherein the direct primary content identifier uniquely identifies a portion of the primary content data stream, the indirect primary content identifier uniquely identifies a portion of the indirect primary content data stream, and the alternative content identifier uniquely identifies a portion of the alternative content data stream.

4. The method of claim 1, wherein at least one of the direct primary content data stream, the indirect primary content data stream, or the alternative content data stream corresponds to one of a video data stream, an audio data stream, or a metadata stream corresponding to the video data stream or the audio data stream.

5. The method of claim 1, wherein the alternative content data stream is a second alternative audio commentary stream.

6. The method of claim 5, wherein the second alternative audio commentary stream is a color commentary data stream or a play-by-play commentary stream.

7. The method of claim 1, wherein the event is a live or recorded sporting event, live or recorded an entertainment event, or a live or recorded video game.

8. A computer system, comprising:
a memory;
a processing device, coupled to the memory, the processing device to:
receive a direct primary content data stream and a secondary content data stream, both the direct primary content data stream and the secondary content data stream associated with an event, the direct primary content data stream comprising a direct primary content identifier;
receive an alternative content data stream corresponding to the event, the alternative content data stream comprising an alternative content identifier and an indirect primary content identifier, the indirect primary content identifier associated with an indirect primary content data stream associated with the event, the indirect primary content identifier and the indirect primary content data stream corresponding to the direct primary content identifier and the direct primary content data stream, respectively, as received by the alternative content system, wherein the alternative content data stream is synchronized to the indirect primary content data stream;

extract the direct primary content identifier from the direct primary content data stream;

extract the alternative content identifier and the indirect primary content identifier from the alternative content data stream;

synchronize the indirect primary content data stream with the alternative content data stream based on the direct primary content identifier, the indirect primary content identifier, and the alternative content identifier, wherein the direct primary content identifier, the indirect primary content identifier, and the alternative content identifier comprise digital watermarks or digital fingerprints;

replace the secondary content data stream with the synchronized alternative content data stream; and transmit the synchronized direct primary content data stream and the synchronized alternative content data stream.

9. The system of claim 8, further comprising:

receiving a second alternative content data stream corresponding to the event;

identifying a second alternative content identifier based on the second alternative content data stream;

synchronizing the second alternative content data stream to the primary content data stream based on the second alternative content identifier and the direct primary content identifier, respectively; and transmitting the synchronized second alternative content data stream.

\* \* \* \* \*